No. 880,881. PATENTED MAR. 3, 1908.
M. HARDSOCG.
PNEUMATIC AND OTHER DRILL.
APPLICATION FILED APR. 15, 1907.
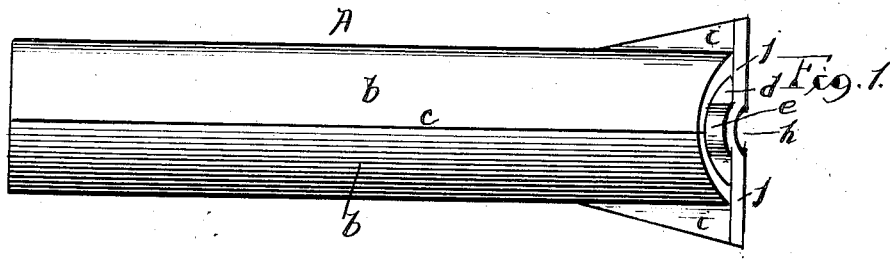
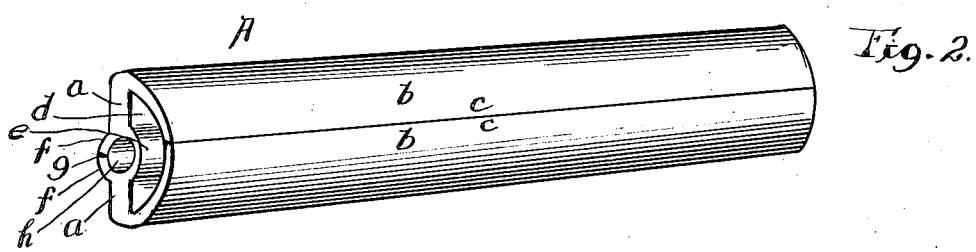
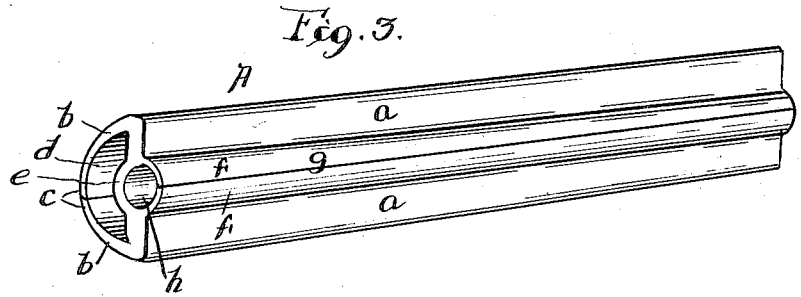
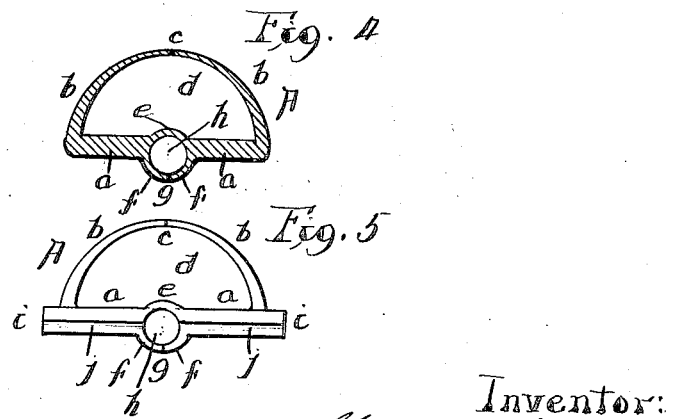
Witnesses
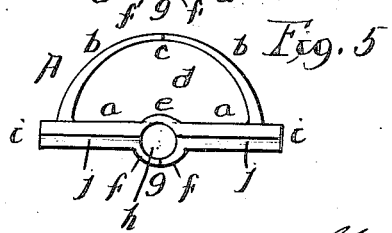
Inventor:
Martin Hardsocg
by Banning & Banning
Attys

UNITED STATES PATENT OFFICE.

MARTIN HARDSOCG, OF OTTUMWA, IOWA.

PNEUMATIC AND OTHER DRILL.

No. 880,881.          Specification of Letters Patent.          Patented March 3, 1908.

Application filed April 15, 1907. Serial No. 368,381.

*To all whom it may concern:*

Be it known that I, MARTIN HARDSOCG, a citizen of the United States, residing at Ottumwa, in the county of Wapello and State of Iowa, have invented certain new and useful Improvements in Pneumatic and other Drills, of which the following is a specification.

The use of pneumatic and other drills is attended with the production of fine dust, which is thrown off by the cutting of the drill and accumulates around the bit of the drill, interfering with the cutting operation; and in addition, this fine dust and particles impregnate the air, and are objectionable for that reason.

The object of the present invention is to construct a drill with a shank or stem by which the dust and fine particles will be removed or taken away and not interfere with the operation of the cutting, or impregnate the air.

The invention consists in the features of construction and combinations of parts hereinafter described and claimed.

In the drawings Figure 1 is a side elevation of a drill constructed in accordance with the present invention, having two cutters or bits; Fig. 2 a perspective longitudinal view of the shank or stem of the drill of the present invention, before forming the bits or cutters at the acting end thereof; Fig. 3 a similar view to Fig. 2, showing the opposite side of the shank or stem to that shown in Fig. 2; Fig. 4 a cross section through the body of the shank or stem; and Fig. 5 an end elevation of the drill shown in Fig. 1.

The drill shown has a shank or stem A formed of a main body or base $a$, two curved wings or flanges $b$ forming a channel or passage $d$, a central longitudinal rib $e$, and two curved flanges $f$ forming, with the central rib $e$, a channel or passage $h$, and each wing $b$ has a flat edge $c$ forming an abutting face to furnish a tight close joint between the wings at their abutting edges, and each wing or flange $f$ has a straight edge $g$ forming an abutting face, so as to make a close tight joint when the wings are brought together. The passage or channel $d$, furnishes a conduit for withdrawing the cuttings, dust and fine particles from the acting end of the drill; and the cuttings, dust and fine particles can also escape through the channel or passage formed between the outside of the shank or stem, and the face of the hole being drilled or cut and be withdrawn, and escape as dry dust or particles into the air at the discharge end of the shank or stem. The channel or passage $h$, furnishes a conduit for supplying air, or other medium under pressure, to the cutting end of the drill, and the air, or other medium under pressure, admitted through the passage $h$ acts to carry back into the channel or passage $d$, and into the channel or passage between the wall of the hole and the exterior face of the shank or stem, the cuttings, dust and fine particles, which would interfere with the operation of the bits or cutters at the cutting end of the drill, thereby keeping the cutting end of the drill perfectly clear and free from becoming clogged and inoperative from the fine dust or particles, and also at the same time, by the passage or channel $d$, and the passage or channel at the side of the shank or stem, into which the air, or other medium under pressure, is carried, removing therewith the dust and fine particles and preventing the same from remaining in the hole or opening, being cut by the drill, and discharging the same at the rear end of the shank or stem into the atmosphere.

The passage $d$ can also be utilized for supplying the compressed air, or other medium under pressure, and the passage $h$ can be utilized for supplying water, or other medium, that will absorb the dust and fine particles carried back through the passage or channel between the wall of the hole and the exterior face of the shank or stem by the escaping air, or other medium under pressure, the water meeting the air and dust while passing out, with the result that the cutting end of the drill is maintained in a cool condition and cannot become clogged or interfered with by fine dust and particles, and the dust and fine particles will not escape in a dry state.

The cutting end of the drill has the main body or base $a$ upset so as to form, on each side, a cutter or blade $i$, each with a cutting edge $j$, and as the cutters or blades wear away, new cutters or blades can be formed by upsetting another section of the main body or base; and in upsetting the main body or base, in order to maintain the passages $d$ and $h$ clear, the walls or wings $b$ and $f$, for the respective passages or channels, are cut back so as to leave a clear discharge for the air, or other medium under pressure, and a clear opening for the escape of the air, or other medium under pressure, with the dust and fine particles commingled therewith, for the dust and fine particles to escape in a dry condition, or moistened by contact with water, or other liquid, as described, the water, or other liquid, being discharged with the dust and fine particles at the rear or discharge end of the shank or stem.

The drill of the present invention furnishes a shank or stem from which two cutters or blades can be readily and quickly formed at the acting end of the shank or stem, and which enables new cutters or blades to be formed readily, as the cutters or blades become worn out or broken, and this without destroying the integrity of the shank or stem, or employing weld-on pieces for the cutters or blades. The shank or stem has formed therewith a supply passage for air, or other medium under pressure, and a passage for withdrawing the fine dust and particles from the acting end of the drill, so that in use the drill, at its acting end, is maintained cool and cannot become clogged or interfered with by fine dust or particles. The passage through which the fine dust and particles escape, can be connected with a hose, or other withdrawing means, and if so desired, water can be supplied through the shank or stem so as to insure the removal of the fine dust and particles without liability of the fine dust and particles escaping so as to impregnate the air or atmosphere at the discharge end of the shank or stem.

What I claim as new and desire to secure by Letters Patent is:

1. A shank for a pneumatic tool, formed of a base, a curved wing extending from each side edge of the base on one face thereof, with the abutting ends of the curved wings in contact and forming, with the base, a passage longitudinally of the shank, a central rib on the base, and a curved wing on each side of the center of the base, with the abutting edges of the wings in contact and forming, with the base, a passage, each passage extending longitudinally of the shank and one passage furnishing a means for admitting a cooling medium to the cutting end of the tool, and the other passage furnishing a means for withdrawing dust and fine particles from around the cutting end of the tool, substantially as described.

2. A shank for a pneumatic tool, formed of a base, a curved wing extending from each side edge of the base on one face thereof, with the abutting edges of the curved wings in contact and forming, with the base, a passage extending longitudinally of the shank, a central rib on the base, and a curved wing on each side of the center of the base and opposite the central rib, with the abutting edges of the wings in contact and forming, with the base, a passage, each passage extending longitudinally of the shank and one passage furnishing a means for admitting a cooling medium to the cutting end of the tool and the other passage furnishing a means for withdrawing dust and fine particles from around the cutting end of the tool, and the base furnishing an end face to produce two bits or cutters, substantially as described.

3. A shank for a pneumatic tool, formed of a base, a curved wing extending from each side edge of the base and on one side thereof, with the abutting edges of the curved wings in contact and forming, with the base, a passage extending longitudinally of the shank, a central rib on the base having a curved exterior face and a curved interior face, a curved wing on each side of the center of the base and opposite the central rib, with the abutting edges of the wings in contact and forming, with the base, a passage, each passage extending longitudinally of the shank and one passage furnishing a means for admitting a cooling medium to the cutting end of the tool, and the other passage furnishing a means for withdrawing dust and fine particles from around the cutting end of the tool, and the base furnishing an end face to produce two bits or blades, substantially as described.

MARTIN HARDSOCG.

Witnesses:
  T. F. NORFOLK,
  GRACE HEFLIN.